(12) United States Patent
Friedrich et al.

(10) Patent No.: US 10,598,224 B2
(45) Date of Patent: Mar. 24, 2020

(54) BEARING CAGE SEGMENT, ANTIFRICTION BEARING, AND ASSEMBLY METHOD

(71) Applicant: Aktiebolaget SKF, Gothenburg (SE)

(72) Inventors: Hans-Juergen Friedrich, Koenigsberg-Roemershofen (DE); Alfred Radina, Poppenlauer (DE); Juergen Reichert, Donnersdorf (DE); Gerhard Wagner, Prichsenstadt (DE)

( * ) Notice: Subject to any disclaimer, the term of this patent is extended or adjusted under 35 U.S.C. 154(b) by 321 days.

(21) Appl. No.: 15/512,854

(22) PCT Filed: Sep. 29, 2015

(86) PCT No.: PCT/EP2015/072297
§ 371 (c)(1),
(2) Date: Mar. 21, 2017

(87) PCT Pub. No.: WO2016/050713
PCT Pub. Date: Apr. 7, 2016

(65) Prior Publication Data
US 2017/0307016 A1    Oct. 26, 2017

(30) Foreign Application Priority Data

Sep. 29, 2014 (DE) .................. 10 2014 219 698

(51) Int. Cl.
*F16C 33/50* (2006.01)
*F16C 33/51* (2006.01)
(Continued)

(52) U.S. Cl.
CPC .......... *F16C 33/51* (2013.01); *F16C 33/4605* (2013.01); *F16C 33/502* (2013.01);
(Continued)

(58) Field of Classification Search
CPC ................ F16C 33/4605; F16C 33/502; F16C 33/4635; F16C 19/547; F16C 19/386;
(Continued)

(56) References Cited

U.S. PATENT DOCUMENTS 9,217,470 B2 * 12/2015 Beck ....................... F16C 43/04
2012/0167391 A1    7/2012 Werner
2013/0294718 A1   11/2013 Fox et al.

FOREIGN PATENT DOCUMENTS

CN    102575712 A    7/2012
DE     2446506 A1    4/1976
(Continued)

*Primary Examiner* — Jason L Vaughan
*Assistant Examiner* — Amanda Kreiling
(74) *Attorney, Agent, or Firm* — Reed Smith LLP

(57) ABSTRACT

A bearing cage segment for a rolling-element bearing includes at least one sliding surface on which a surface of at least one rolling element of the rolling-element bearing is rotatable, a first support element, such as an axial projection on an axial side of the cage segment having a radially open radially facing channel, at a first radial position for supporting a first band section of a band clamp during an assembling of the rolling-element bearing, and at least one second support element at a second radial position different from the first radial position for supporting a second band section of the band clamp.

20 Claims, 9 Drawing Sheets

(51) Int. Cl.
*F16C 33/46* (2006.01)
*F16C 43/06* (2006.01)
*F16C 19/36* (2006.01)
*F16C 19/54* (2006.01)
*F16C 19/38* (2006.01)

(52) U.S. Cl.
CPC ............ *F16C 43/06* (2013.01); *F16C 43/065* (2013.01); *F16C 19/364* (2013.01); *F16C 19/385* (2013.01); *F16C 19/386* (2013.01); *F16C 19/542* (2013.01); *F16C 19/547* (2013.01); *F16C 19/548* (2013.01); *F16C 33/4635* (2013.01); *F16C 2240/70* (2013.01); *F16C 2300/14* (2013.01); *F16C 2360/31* (2013.01)

(58) Field of Classification Search
CPC .... F16C 19/542; F16C 19/364; F16C 19/548; F16C 19/385; Y10T 29/49636; Y10T 29/49679; Y10T 29/4968; Y10T 29/49682; Y10T 29/49684; Y10T 29/49686; Y10T 29/49687; Y10T 29/49689; Y10T 29/49691; Y10T 29/53104

See application file for complete search history.

(56) References Cited

FOREIGN PATENT DOCUMENTS

| | | |
|---|---|---|
| DE | 102007002359 A1 | 7/2008 |
| DE | 102007002360 A1 | 7/2008 |
| DE | 102011004374 A1 | 8/2012 |
| DE | 102011089078 A1 | 6/2013 |
| DE | 102012216364 A1 | 3/2014 |
| WO | 2008040290 A1 | 4/2008 |
| WO | 2011080961 A1 | 7/2011 |

\* cited by examiner

BEARING CAGE SEGMENT, ANTIFRICTION BEARING, AND ASSEMBLY METHOD

CROSS-REFERENCE

This application is the U.S. National Stage of International Application No. PCT/EP2015/072297 filed on Sep. 29, 2015, which claims priority to German patent application no. 10 2014 219 698.1 filed on Sep. 29, 2014.

TECHNOLOGICAL FIELD

The following invention relates to a bearing cage segment for a rolling-element bearing, in particular a tapered-roller rolling-element bearing, and a method of assembling a rolling-element bearing.

BACKGROUND

Large tapered roller bearings, which have, for example, a diameter of greater than 1 m, can usually only be installed separated using a steel-bolt cage or using a steel cage (wherein in particular the inner ring and the outer ring are separated). However, such cage types are very cost-intensive in their manufacture and acquisition. Furthermore, the tolerances of one-part cages or the cage stabilization can be extremely critical. For example, it can be necessary that the required cage clearance of one-part cages (which in particular form a coherent structure in order to be able to receive all rolling elements for the rolling-element bearing) grow with the diameter (loaded zone/unloaded zone, cage passage, speed differences of the rolling elements, etc.). In terms of design technology this may not always be possible with one-part cages due to roller-/cage-guiding problems. Furthermore, one-part very large cages (XXL cages) have high demands with respect to the guiding in order to avoid cage deformations. Furthermore, one-part cages have high masses, which makes an installing difficult. In the event of an installing or assembling it is required that in an assembly step the inner ring including cage and rollers is present separated from the outer cage; it is conventionally necessary to use a steel-bolt cage or a steel cage, which is respectively one-part, in order to be able to receive all rollers or rolling elements therein. For this reason the above-mentioned difficulties and technical problems arise.

SUMMARY

It is an object of the present invention to provide equipment or devices and methods, which to make possible an assembling of a rolling-element bearing under different requirements, in particular with the requirement that in an assembly or installation step the inner ring of the rolling-element bearing with the cage or the cages and the rolling elements are present separated from the outer ring of the rolling-element bearing. This can be necessary, for example, with an installation of a rolling-element bearing for a wind turbine.

The invention thus provides cost-effective cage components, wherein a simple assembly of the roller set and the cage segments is made possible. Furthermore fewer problems arise with the cage tolerances, and the cages have a lower cage mass. Furthermore an overhead installation is possible.

According to one embodiment of the present invention a bearing cage segment is provided for a rolling-element bearing, in particular a tapered-roller rolling-element bearing or cylindrical-roller rolling-element bearing or spherical roller bearing (that includes barrel-shaped rolling elements), which includes at least one sliding surface (in particular at least one first and one second, which in particular are both circumferentially outer sliding surfaces), on which a surface of at least one rolling element of the rolling-element bearing is rotatable about an axial direction; a first support element at a first radial position for supporting a first band section of a band clamp during a clamping/assembling of the rolling-element bearing; at least one second support element, at a second radial position different from the first radial position, for supporting a second band section of the band clamp.

A plurality of such bearing cage segments can be used for installing or for assembling a rolling-element bearing with the result that such a bearing cage segment corresponds to 1 (one) rolling element or roller, 1.5 rolling elements or rollers, 2 rollers, or even more rollers. However, this correspondence of a bearing cage segment to 1, 1.5, or 2, or even more rolling elements only applies based on the total number of cage segments and rollers in the rolling-element bearing.

For example, a surface of a first rolling element of the rolling-element bearing can be rotatable on the first sliding surface, and a surface of a (different) second rolling element can be rotatable on the second sliding surface. The bearing cage segment can include, for example, exactly two sliding surfaces, namely the first and the second sliding surface, via which the bearing cage segment is in contact with two different rolling elements. In this case the bearing cage segment can be regarded as a bridge with two sliding surfaces (the first and a second) in order to hold two adjacent rolling elements at a spacing without receiving a rolling element in its interior. In another case the bearing cage segment can receive a first rolling element in an interior of the bearing cage segment, wherein the rolling element received in the interior is, for example, rotatable on a third sliding surface and is furthermore rotatable on a fourth sliding surface (which are both directed toward an interior of the bearing cage segment). Further rolling elements can be rotatable on two outer (e.g., the first and the second) sliding surfaces of the bearing cage segment. In the first case, if the bearing cage segment is merely a bridge including two sliding surfaces, both the first and the second sliding surface can be an outer sliding surface. In the case wherein the bearing cage segment receives a rolling element in an interior of the bearing cage segment the first sliding surface can be an outer sliding surface and the second sliding surface can be an outer sliding surface of the bearing cage segment; two others can be inner sliding surfaces.

Furthermore, the bearing cage segment can receive more than one rolling element in an interior of the bearing cage segment, for example, 2, 3, 4, 5, or even more rolling elements. However, in any case the first sliding surface is oriented opposed to the second sliding surface (and in particular circumferentially external), with the result that normal vectors of the first sliding surface and of the second sliding surface are directed opposed or at least opposed substantially or on average.

Due to the nature and geometry of the at least one sliding surface the rolling element (e.g., conical or cylindrical) rotatably abutting thereon has a defined orientation of its axis of rotation. Here the axis of rotation of the rolling element is oriented in the axial direction, whereby the axial direction is defined. The axial direction thus refers to an axis of rotation of the rolling element, which need not necessarily (in particular in the case of a tapered roller bearing) be parallel or coincident with an axis of rotation of the installed rolling-element bearing. In a cylindrical-roller rolling-element bearing the axial direction of each rolling element (that is, cylindrical element) can be parallel to the axis of rotation of the rolling-element bearing. However, in the case of a tapered-roller rolling-element bearing axial directions of the rollers are inclined against the axis of rotation of the tapered roller bearing. When the axis of rotation of the rolling-element bearing is meant, this is indicated by the designation rolling-element-bearing axial direction or rolling-element-bearing axis of rotation.

The radial direction and thus the radial positions are to be understood with reference to the axial direction (of the rolling element), wherein a radial direction is definable as a direction perpendicular to the axial direction of the rolling element. The radial direction with regard to the rolling elements can in turn be different from a radial direction which is with regard to the entire rolling-element bearing. Furthermore, for the bearing cage segment a circumferential direction can be defined which is perpendicular to the axial direction and also perpendicular to the radial direction of the rolling element, which rotatably abuts on the sliding surface of the bearing cage segment.

The first support element and/or the second support element can comprise, for example, a projection or a protrusion, which extends (at least) in the axial direction. The bearing cage segment can comprise, for example, an axial bridge (or a plurality of axial bridges) extending in the axial direction and circumferential bridges extending in a circumferential direction, between which the rolling elements can be disposed, for example, in the case wherein the bearing cage segment receives at least one rolling element in its interior. In the case of a single bridge the bearing cage element can include only one (single) axial bridge, without including a single circumferential bridge.

Here the first and the second support element can support the respective band section on one side, on which a radially-inner-lying shoulder surface of an inner ring of the rolling-element bearing is disposed during installation and also in the installed rolling-element bearing, and abut here, during the installation of the bearing, on the radially-outwardly-facing, radially-inward-lying shoulder surface. During a clamping the band clamp can thus exert a force on the bearing cage which is directed toward the radially-outwardly-facing, radially-inward-lying shoulder surface of the inner ring, so that the first and the second support element abut on and are pressed against this shoulder surface. Thus a clamping of a plurality of bearing cage segments together with rolling elements, which abut on an inner ring of the rolling-element bearing, can be achieved, after which an outer ring of the rolling-element bearing, which was previously separated from the inner ring with the rolling elements and the bearing cage segments, can be put on.

The first support element and the second support element can be disposed on an axial outer side of the bearing cage segment that corresponds to an end side of the rolling element rotatable on the surface, which axial outer side is less accessible during an assembling of the rolling-element bearing than another axial outer side of the bearing cage segment. Thus the first support element is disposed on (the same) axial outer side of the bearing cage segment as the second support element. Furthermore, the bearing cage segment has another axial outer side, which is axially spaced from the axial outer side. Another end side of the rolling element rotatable on the surface is disposed on the other axial outer side. Thus during an installation of a plurality of bearing cage segments together with rolling elements the band clamp can be fixed or supported on the inner ring of the rolling-element bearing at different radial positions, namely the first radial position and the second radial position, so that the band clamp need not cross over or overlap.

The band clamp here can have a cross-sectional height, which corresponds, for example, to $\frac{1}{100}$ to $\frac{1}{4}$ of a cross-sectional width. In particular, the band clamp can have, for example, a cross-sectional height of from 0.5 mm to 3 mm, in particular 1 mm. The band clamp can include Kevlar®, a composite material, and/or can comprise in particular a polyester load band. The band clamp can include polyester-reinforced textile fibers, be movable and elastic and water-resistant. It can be glued and/or woven.

The clamping force that can be applied by the band clamp (and the tension cable mentioned later) can fall between 300 kg and 5 t. A rolling-element bearing installable using the bearing cage segment can have a diameter between 1 m and 10 m, in particular 1.5 m to 5 m.

The first and the second radial position can be selected such that the first band section does not overlap or cross over with the second band section during the clamping/assembling of the rolling-element bearing. The first radial position here can be spaced from the second radial position such that the band clamp supported by the first support element has a spacing from the band clamp supported by the second support element which is greater than 0 mm, in particular, for example, 0.1 mm to 50 mm. In particular a cross-sectional width of the band clamp can be matched to the spacing between the first radial position and the second radial position.

The at least one sliding surface can comprise a first sliding surface and a second sliding surface, wherein the first and the second radial position are selected such that a band section adjacent to the first band section abuts toward a first end of the tension cable in a first radial region on the first sliding surface, and such that a band section adjacent to the second band section abuts toward a second end of the tension cable in a second radial region on the second sliding surface when the band clamp is looped around the bearing cage segment, so that the first end and the second end of the tension cable come to rest on the other axial outer side. During an installing of the rolling-element bearing the band clamp can thus be looped, from the axial side on which it is supported by the first support element and the second support element, abutting on the first sliding surface, around the bearing cage segment with a band section adjacent to the first band section. Furthermore the band section adjacent to the second band section can be looped abutting on the second sliding surface from the axial outer side around the bearing cage segment, with the result that the first end and the second end of the band clamp can be set under tension on the other axial outer side and can be clamped and fixed with a clamping- or fixing-device.

The bearing cage segment can further include a third support element for supporting a cable section of a tension cable during the clamping/assembling of the rolling-element bearing, wherein the third support element is disposed on another axial outer side of the bearing cage segment, which axial outer side corresponds to another end surface of the rolling element rotatable on the surface, and can in particular be formed by a pair of third support elements that protrude in an axial direction on the axial outer side of the bearing cage segment. The other axial outer side of the bearing cage segment can be more easily accessible than the axial outer side. With tensioned tension cable the third support element and in particular also the pair of third support elements on the other axial outer side can abut on a radially-outwardly-facing radially-outer-lying shoulder surface of the inner ring.

For supporting the band- or cable-section the first, the second, and/or the third support element can protrude essentially in an axial direction, in particular be formed at least partially concave, further in particular parabolic, wherein during the clamping/assembling of the rolling-element bearing the band section exerts a force on the support elements, which in particular is directed radially inward, without the support elements completely surrounding the band- or cable-section. Thus an installing can be carried out under different conditions. The first and second support element can abut and be pressed on the radially-outwardly-facing radially-inner-lying shoulder surface of the inner ring, whereas the third support element can abut and be pressed on the radially-outwardly-facing shoulder surface of the inner ring.

A bearing cage segment or installation equipment for it can further include a band fixing device, which can be disposed on the other axial outer side, for fixing and/or clamping of the ends of the band clamp, wherein the fixing device in particular includes a metal clamp with brackets for clamping two end sections of the band clamp and/or a fixing block for placing on the other axial outer side of the bearing cage segment.

The band fixing device can be configured for clamping and/or fixing the band clamp. The fixing block can be embodied in its geometry to be placed on the other axial outer side of the bearing cage segment under interference fit so that, for example, a shifting or rotating of the fixing block during installation is prevented. The metal clamp can hold the respective band section using a frictional force, which is generated by metal rods clamped against one another. Alternatively the band can be knotted or fixed in another manner so that its two ends are connected such that the required clamping force can be maintained.

The bearing cage segment can be configured for holding a rolling element in the interior, wherein the at least one sliding surface can include two inner sliding surfaces on which a rolling element abuts, and two outer sliding surfaces on which a further rolling element respectively abuts. Thus a so-called single-segment cage can be provided, which receives a rolling element in its interior and includes sliding surfaces on each of its circumferential outer sides in order to respectively allow a further rolling element to abut thereon.

According to a further embodiment of the present invention a rolling-element bearing is provided, which includes at least one bearing cage segment according to one of the preceding embodiments, a plurality of rolling elements, of which at least one rotatably abuts on the sliding surface, an inner ring, on which the plurality of rolling elements spaced in the circumferential direction by bearing cage segments abut, and an outer ring, which is placed on the inner ring with rolling elements and bearing cage segments. Here the inner ring can be disposed on the side of the bearing cage segment towards which the support elements (the first, second, and third support element) support the band clamp or the tension cable. The rolling-element bearing can in particular have been installed by a method for assembling a rolling-element bearing according to one embodiment of the present invention.

In particular the rolling-element bearing can be a rolling-element bearing of a rotor of a wind turbine.

According to one embodiment of the present invention a method is provided for assembling a rolling-element bearing, in particular a tapered roller bearing, which includes the following steps:

disposing of rolling elements on an inner ring;

disposing of at least one bearing cage segment respectively with a first and a second sliding surface such that at least one thereof abuts on a surface of at least one of the rolling elements;

supporting of a first band section of a band clamp using a first support element of at least one of the bearing cage segments at a first radial position on an axial side of the bearing cage segment, which in particular is less accessible during the assembling of the rolling-element bearing than another axial outer side of the bearing cage segment;

supporting a second band section of the band clamp using a second support element of the bearing cage segment at a second radial position on the axial side of the bearing cage segment;

guiding a band section adjacent to the first band section around the bearing cage segment such that the band section adjacent to the first band section comes to rest between one of the rolling elements and the first sliding surface, and a first band end comes to rest on another axial outer side of the bearing cage segment;

guiding a band section adjacent to the second band section around the bearing cage segment such that the band section adjacent to the second band section comes to rest between another of the rolling elements and the second sliding surface, and a second band end comes to rest on the other axial outer side of the bearing cage segment;

in particular further including:

tensioning the band by pulling on the first band end and the second band end;

tensioning a cable, which is supported by a third support element of the bearing cage segment on the other axial outer side of the bearing cage segment, wherein in particular the band clamp can be removed from the other axial outer side of the bearing cage segment, which is more accessible, after completion of the assembling.

In particular the method can be carried out with a vertically placed inner ring or also with an inner ring placed overhead (wherein the rolling elements and the bearing cage segments are disposed below the inner ring). Here the vertical orientation or the overhead orientation can only be assumed after the rolling elements together with the bearing cage segments have been clamped on the inner ring using the band clamp and the tension cable. A disposing of the rolling elements, disposing of the bearing cage segments, guiding-around of the band sections, and tensioning of the band and/or of the cable can be carried out in a horizontal orientation of the inner ring.

Using a load band and a cable, special single-segment cages and the associated roller set can be clamped on the TRB (taper roller bearing)-inner ring for the installing of a separable XXL tapered roller bearing. This band and the cable can be easily removed after the installing of the bearing.

Exemplary embodiments of the present invention are now explained with reference to the accompanying drawings. The invention is not limited to the described and illustrated embodiments. Reference numbers in the claims do not limit the scope of the present invention.

DETAILED DESCRIPTION

Identical elements in the various Figures are indicated with the same reference numbers, which differ at most in their first digit. If an element in a certain Figure is not explicitly described, then the description of this element can be taken from the description of another Figure.

Figure 1B:
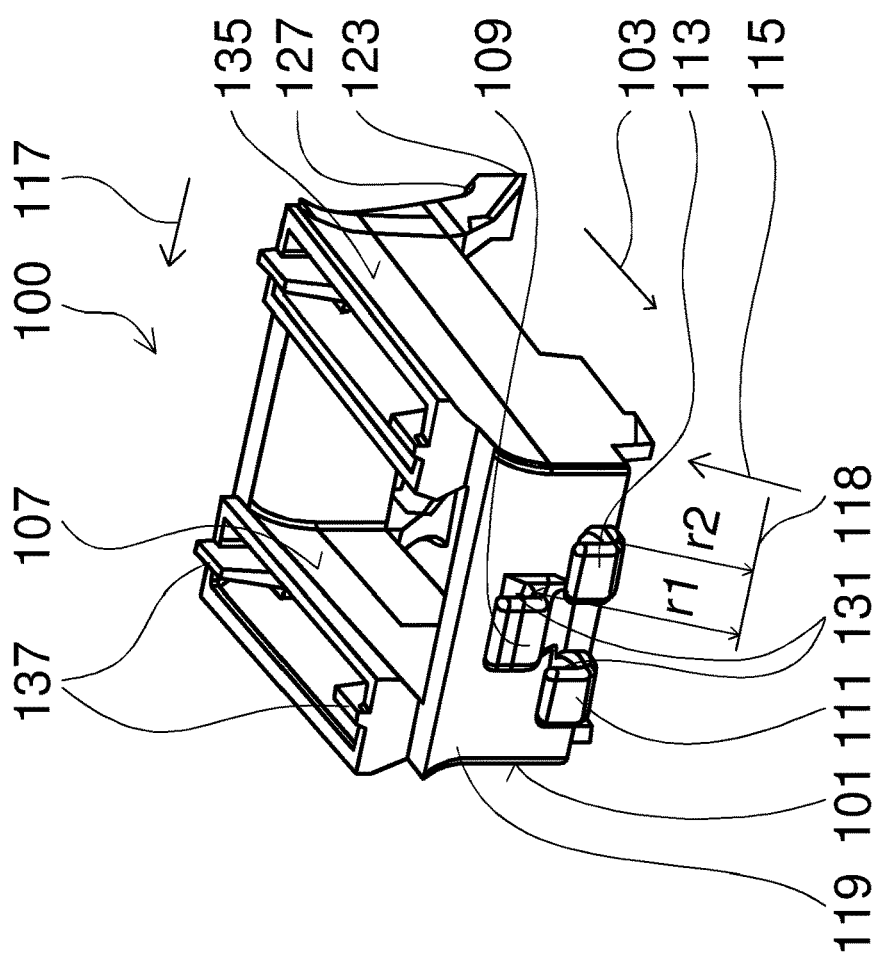
FIGS. 1A and 1B respectively show perspective views of a bearing cage segment according to an embodiment of the present invention.
Figure 1A:
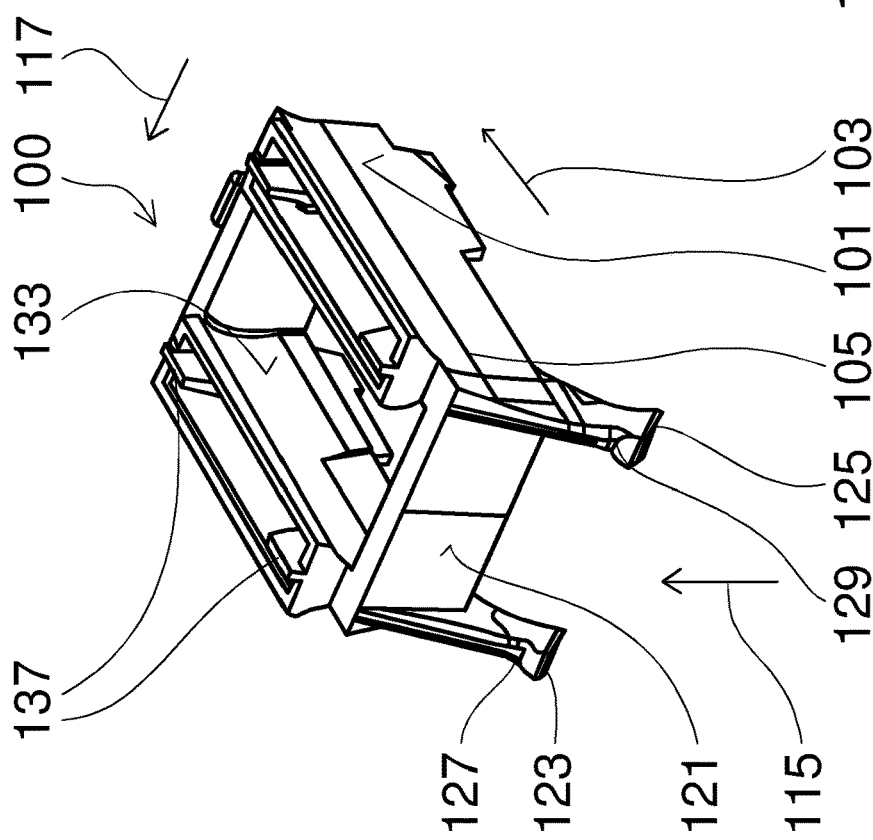

FIGS. 1A and 1B illustrate two perspective views of a bearing cage segment 100 according to an exemplary embodiment of the present invention. The bearing cage segment 100 includes a sliding surface 101 on which a first rolling element (not illustrated) of a to-be-installed rolling-element bearing is rotatable about an axial direction 103. Here the axial direction 103 is given, for example, by the axis of rotation of the not-depicted rolling element or parallel thereto, which rolling element rotatably abuts on the first sliding surface 101. The axial direction 103 can alternatively (if the rolling elements are cylindrical) be defined as a direction in the first sliding surface 101 in which the first sliding surface 101 is not curved. The direction in the sliding surface 101 in which the sliding surface 101 is not curved is indicated by reference number 105. In general the directions 105 and 103 need not be parallel, for example, in the case wherein tapered rolling elements are used. However, the deviations between the two directions 105 and 103 should typically be less than 15°.

The bearing cage segment 100 further includes a second sliding surface 135 on which a surface of a second (not depicted) rolling element is rotatable. Furthermore the bearing cage segment 100 includes a first support element 109 at a first radial position r1 (or a radial spacing of a placement surface of the support element with respect to a reference line 118, which radial spacing is a spacing in radial direction 115 measured perpendicular to the circumferential direction 117) for supporting a not-depicted first band section of a band clamp and further includes a pair of second support elements 111, 113 at a second radial position 42 (or radial spacing) for supporting a second band section of the band clamp. Here the radial direction 115 is perpendicular to the axial direction 103 and also perpendicular to a circumferential direction 117.

In a rolling-element bearing a plurality of bearing cage segments (comprising at least one bearing cage segment 100) are lined up along the circumferential direction 117 in order to form a rolling-element bearing. The first support element 109 and the pair of second support elements 111, 113 is disposed on an axial outer side 119 of the bearing cage segment 100. During an assembling of a rolling-element bearing this axial outer side 119 is less accessible than another axial outer side 121. The first radial position r1 is a position of a placement point of the band clamp on the first support element 109, and the second radial position r2 is a position of a placement surface or of a placement point of the band clamp on the pair of two support elements 111, 113. In the embodiment depicted here the first support element 109 and the pair of second support elements 111, 113 protrude in the axial direction from the axial outer side 119 and have parabolic shape. A band clamp inserted into the support elements 109, 111, 113 is not completely surrounded by the support elements 109, 111, and 113. Due to such support elements 109, 111, or 113 the bearing cage segment can thus not be threaded on the band. The support elements 109, 111, 113 support the band clamp upward due to a force effect in the direction of the radial direction 115 in FIGS. 1A and 1B.

On the other axial outer side 121 the bearing cage segment 100 includes a pair of third support elements 123, 125 in order to support a not-illustrated cable section of a tension cable, and which protrude axially as well as radially on the other axial outer side 121. The placement points or placement surfaces of a tension cable on the third support elements 123, 125 are indicated by reference numbers 127, 129 and have a concave shape. Placement points or placement surfaces 131 of the first and of the second support element 109, 111, and 113 are also of concave shape in order to secure a band clamp from slipping, while a force is exerted on the band clamp in the radial direction 115. The third support elements 123, 125 on the other axial outer side 121 are provided for the supporting of a tension cable.

The bearing cage segment 100 is a so-called single bearing cage segment, which can receive a rolling element in an interior and is in contact on its exterior with two tolling elements while it is installed in a rolling-element bearing. For this purpose the third bearing cage segment 100 includes a third sliding surface 133, which together with the fourth sliding surface 107 represents two inner sliding surfaces. A single rolling element slides on these inner sliding surfaces 107 and 103 during a bearing operation. Together with the first sliding surface, the second sliding surface forms two outer sliding surfaces on each of which a rolling element rotatably abuts during a bearing operation.

The bearing cage segment 100 further includes support bridges 137 for supporting on an outer ring of a rolling-element bearing. Furthermore the third support elements 123, 125 also have a function for shoulder supporting on an inner ring of the rolling-element bearing, which in FIGS. 1A and 1B are disposed below the bearing cage segment 100, while the outer ring of the rolling-element bearing is disposed above the bearing cage segment 100.

Figure 2:
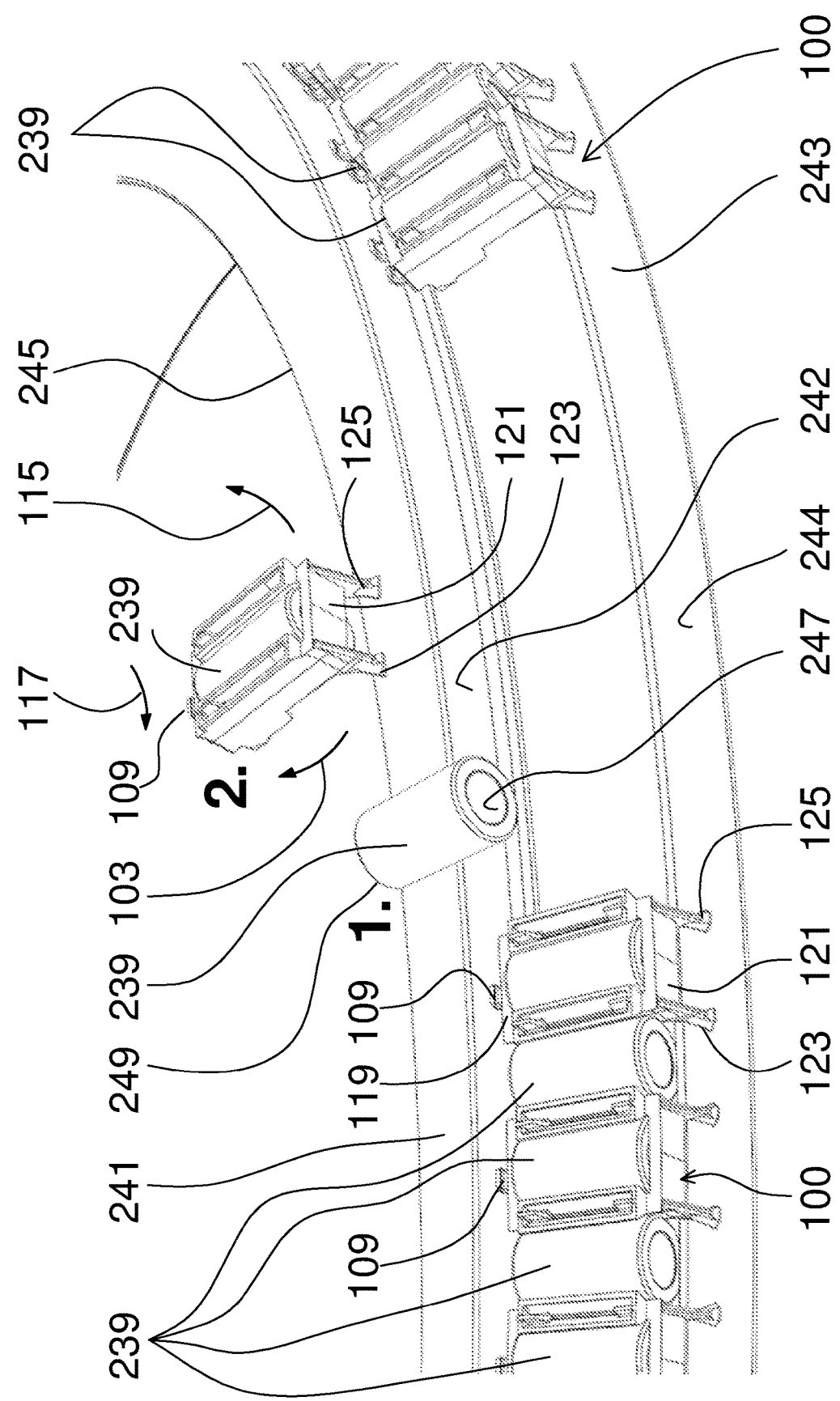
FIG. 2 shows steps of an assembly method of a rolling-element bearing using a bearing cage segment according to an embodiment of the present invention.

FIG. 2 shows steps of an installation process of a rolling-element bearing according to an embodiment of the present invention, wherein the bearing cage element 100 illustrated in FIG. 1A and FIG. 1B is used. Here the bearing cage segment 100 can be manufactured from plastic (for example, PEEK), fiber composite materials, metal- or metal-plasticcombinations. First a set of rollers or rolling elements 239 are placed on a horizontally lying inner ring. The inner ring 241 has a radially outwardly facing inner shoulder surface 242 and a radially outwardly facing outer shoulder surface 244. Subsequently a bearing cage segment 100 is positioned over every second roller 239. As can be seen in FIG. 2, here the other axial outer side 121, on which the third support elements 123 and 125 are disposed, is directed toward an outer side 243 of the inner ring 241, against which the axial outer side 119 is oriented toward an inner side 245 of the inner ring 241. Another end side 247 of the rolling element 239 is disposed on the other axial outer side 121, and an end side 249 of the rolling element 239 is disposed on the axial outer side 119 of the bearing cage segment 100. The rolling elements 239 can be cylindrical or conical.

Figure 3:
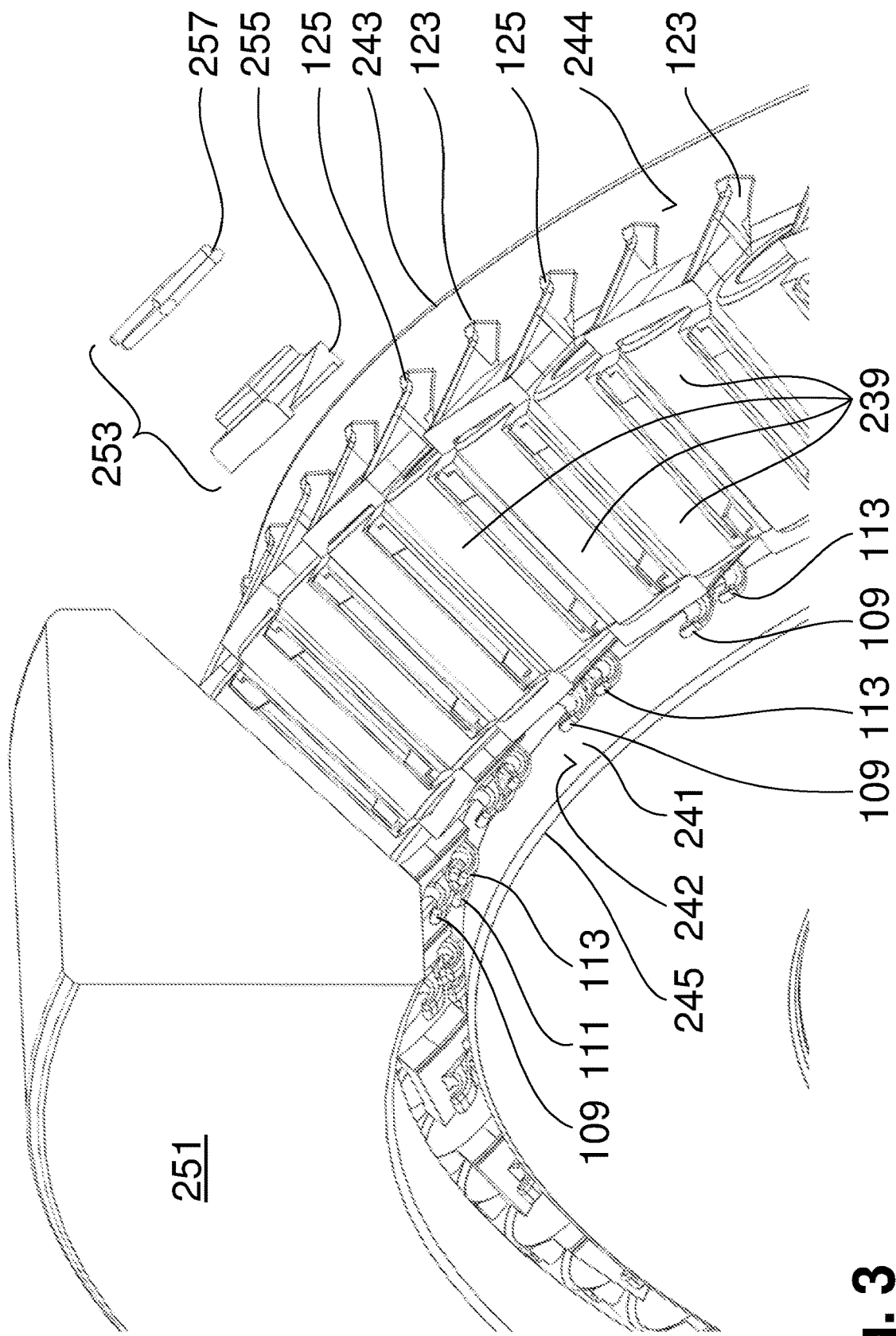
FIG. 3 shows further steps of an assembly method of a rolling-element bearing according to an embodiment of the present invention.

FIG. 3 shows a further step of an installation or of a removal of a rolling-element bearing. With an installation an outer ring 251 is separated from the inner ring, the rolling elements, and the bearing cage segments and should be ignored here. After all rolling elements and bearing cage segments have been inserted or disposed on the inner ring 241 in a horizontal arrangement, a band fixing device 253, which includes a fixing block 255 and a metal clamp 257, is placed on one of the bearing cage segments in order to later be able to clamp and fix a band clamp. As can be seen from FIG. 3 the band fixing device 253 is placed from the outer side 243 of the inner ring 241 of the rolling-element bearing. The inner side 245 of the inner ring 241 of the rolling-element bearing can be difficult to access during an installation, however the outer side 243 of the inner ring 241 can be more easily accessible.

Figure 4:
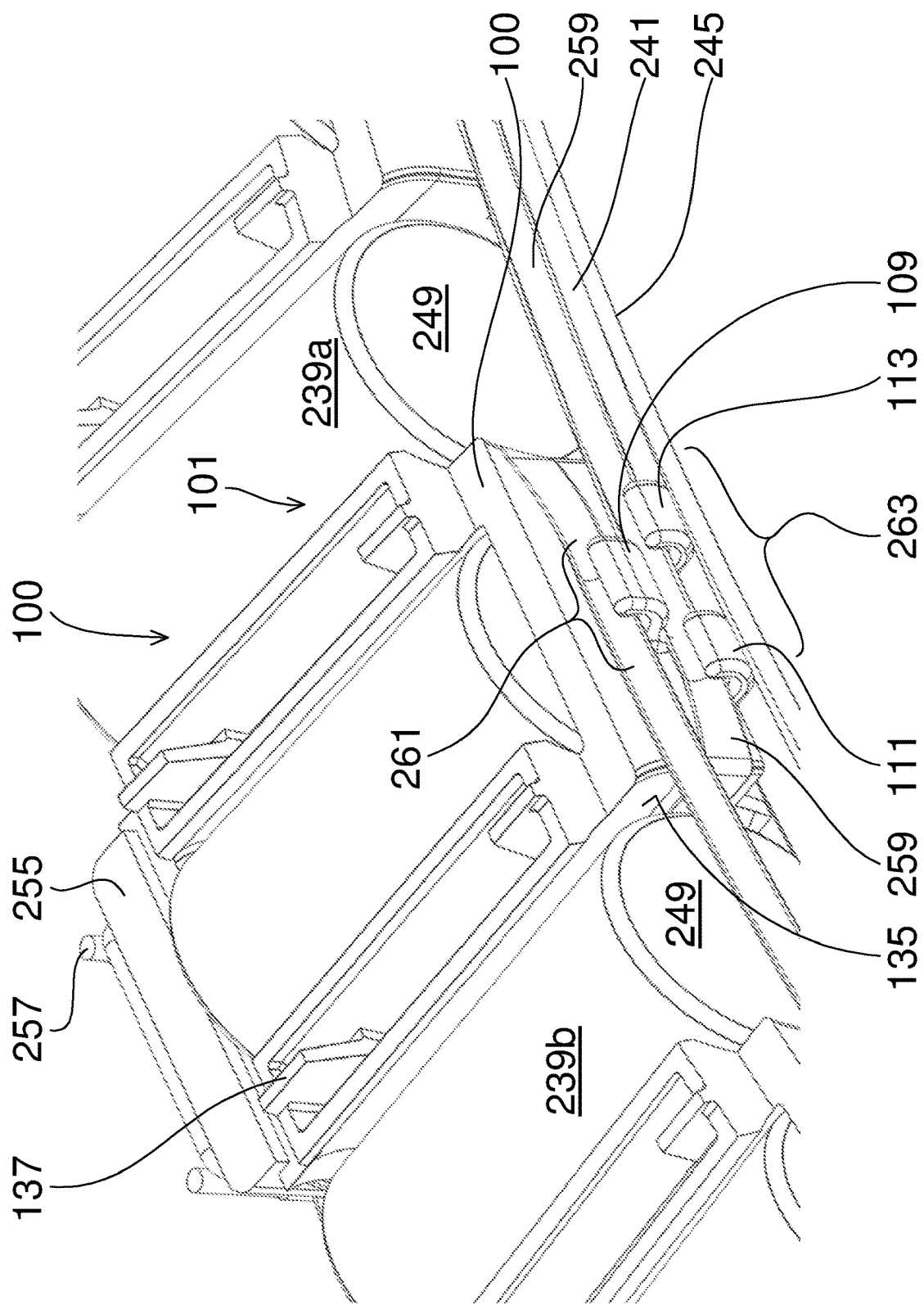
FIG. 4 illustrates a part of a rolling-element bearing in an installed state wherein the outer ring is not yet installed.

On the inner side 245 of the inner ring 241 a band clamp 259 is inserted into the first support element 109 and the second support element 111, 113, as is illustrated in FIG. 4, when viewed from the inner side 245 of the inner ring 241. In particular the first support element 109 supports a first band section 261 of the band clamp 259, and the second support elements 111, 113 support a second band section 263 of the band clamp 259. As can be seen from FIG. 4, the first band section 261 does not overlap with the second band section 263, since the two band sections are supported in different radial positions by the support elements 109, 111, 113. As can also be seen in FIG. 4 a band section adjacent to the first band section 261 is disposed between the first sliding surface 101 of the bearing cage segment 100 and a rolling element 239a, so that therefore in the installation case the rolling element 239a does not or only partially contacts the sliding surface 101 with its outer surface, since a band section of the band clamp 259, which band section is adjacent to the first band section 261, is disposed therebetween. As can also be seen from FIG. 4 a band section adjacent to the second band section 263 is disposed between the second sliding surface 135 and the rolling element 239b, so that during an installation the outer surface of the rolling element 239b does not abut on the second sliding surface.

Identical elements in the various Figures are indicated with the same reference numbers, which differ at most in their first digit. If an element in a certain Figure is not explicitly described, then the description of this element can be taken from the description of another Figure.

Figure 5:
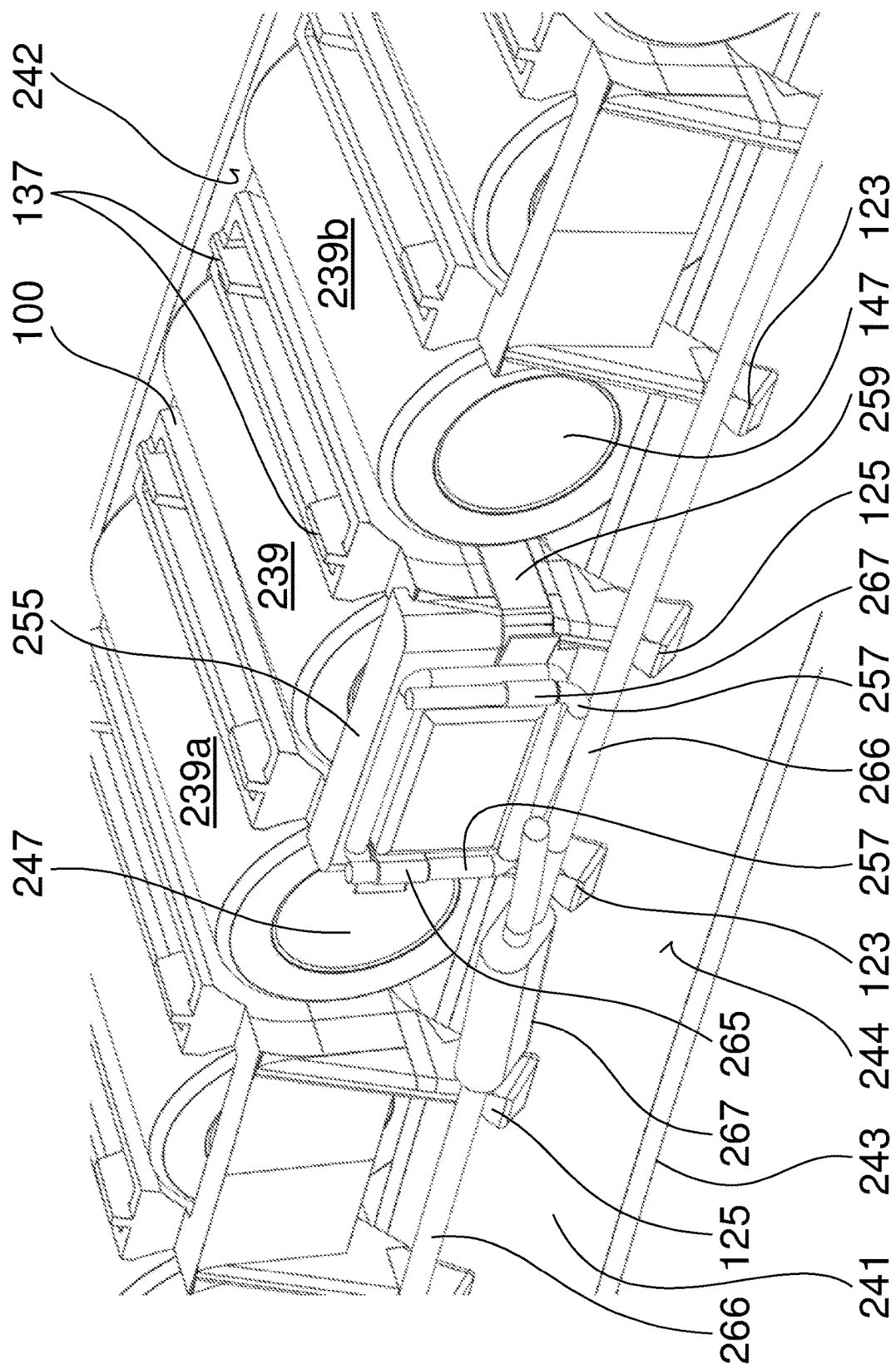
FIG. 5 shows another view of the installed state of FIG. 4.

FIG. 5 illustrates the state during an installation, which corresponds to that illustrated in FIG. 4, wherein therefore both the installation band 259 and an installation- or tension-cable 266 is applied in order to achieve a clamping. However, FIG. 5 illustrates a view from the outer side 243 of the inner ring 241. The first and the second support element 109, 111, 113 about on the radially-outwardly-facing inner shoulder surface 242, and the third support elements 123, 125 abut on the radially outwardly facing outer shoulder surface 244.

A first end 265 of the band clamp 259 (which represents an end of the band section adjacent to the first band section 261) is fixed here using the metal clamp 257. A second end 267 (which represents an end of the band section adjacent to the second band section 263) is also fixed by the metal clamp 257. The fixing is effected in particular after clamping of the band clamp 259 to a required clamping force. Here the metal clamp 257 is placed on the fixing block 255, which in turn is placed on the bearing cage segment 100 on the other axial outer side 121. Thus the beginning and the end of the band clamp 259 are guided left or right through between rollers 239a, 239b, and sliding surfaces 101, 135 around a bearing cage segment so that a clamping of the band clamp 259 is made possible. The start and end of the band clamp are thus applied to the accessible outer side 243 of the inner ring 241 and clamped. The tension cable 266 is also supported on the outer side 243 of the inner ring 241 by the third support elements 123, 125 and clamped or fixed using a further fixing device 267. Here an available end clearance between the last inserted roller and a bearing cage segment is sufficient for the inserting of the band clamp 259 between a rolling element and an associated sliding surface.

Figure 6:
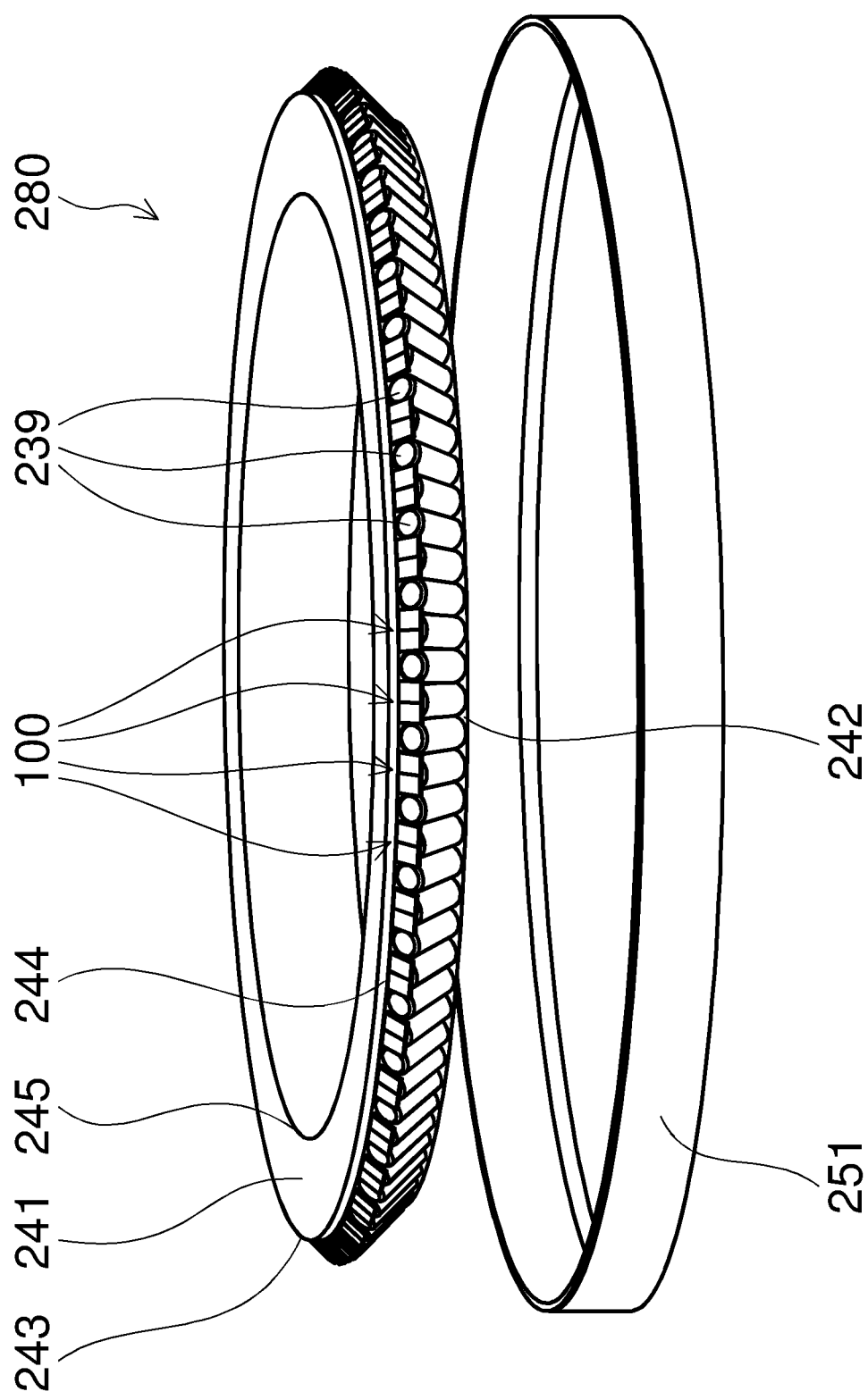
FIG. 6 shows an installed state of a rolling-element bearing before placing of an outer ring on an inner ring with clamped rolling elements and bearing cage segments in an overhead orientation.

FIG. 6 illustrates a further assembly step for assembling a rolling-element bearing 280 according to an embodiment of the present invention, wherein a state is started from wherein rolling elements 239 and bearing cage segments 100 are clamped on the inner ring 241 as illustrated in FIGS. 4 and 5. Due to a projection in the inner ring 241 the clamped combination of rolling elements and bearing cage segments also maintain the orientation in a head-over orientation as illustrated in FIG. 6. Alternatively a vertical orientation (or any other orientation) of the inner ring can be chosen for an installation. The outer ring 251 can then be placed, for example, in the head-over orientation or in a vertical orientation of the inner ring 241, onto which the rolling elements and the bearing cage segments are clamped.

Once the inner ring 241 together with rolling elements and bearing cage segments have been installed with the outer ring 251, both the band clamp 259 and the tension cable 266 are removed. For this purpose, for example, the metal clamp 257 is relaxed and the band clamp 259 is removed from the accessible side, that is, for example, the outer side 243 of the inner ring 241. Thereafter the metal clamp 257 and the fixing block 255 can be removed. Furthermore the fixing element 257 is released and the tension cable 266 is removed. Thus the bearing is operational for a bearing operation.

Figure 7:
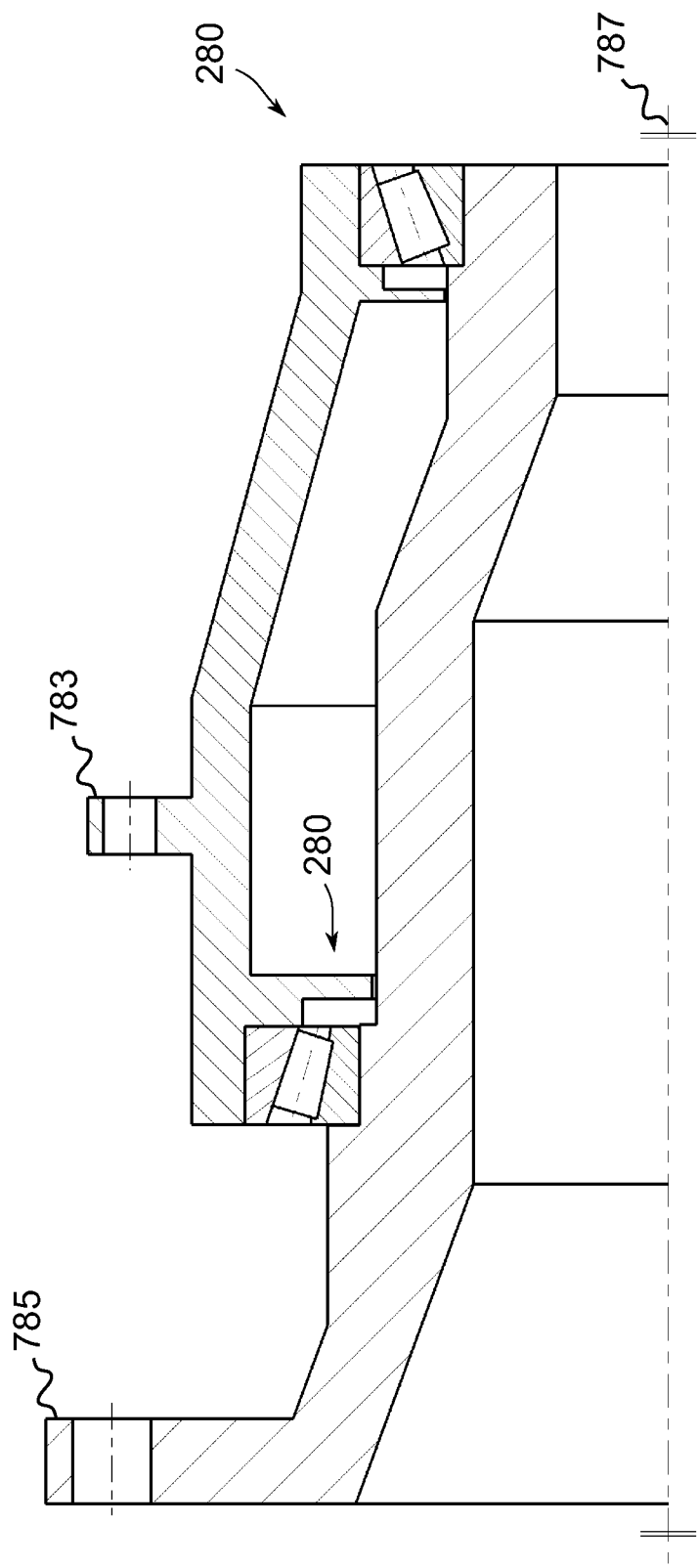
FIG. 7 illustrates schematically in a sectional view a double tapered roller bearing, wherein each of the tapered roller bearings has been installed using a method for assembling a rolling-element bearing according to an embodiment of the invention.

FIG. 7 illustrates in cross-sectional view a bearing for a rotor of a wind turbine, which is embodied as a double rolling-element bearing. Each of the bearings 280 comprises at least one bearing cage segment 100, as is illustrated in FIGS. 1A and 1B and is installed by an installation method according to one embodiment of the present invention, such as, for example, is illustrated in FIGS. 2 to 6. A hub can be connected at 783, 785 illustrates a rotor side, 787 illustrates a bearing axis of rotation.

Figure 8A:
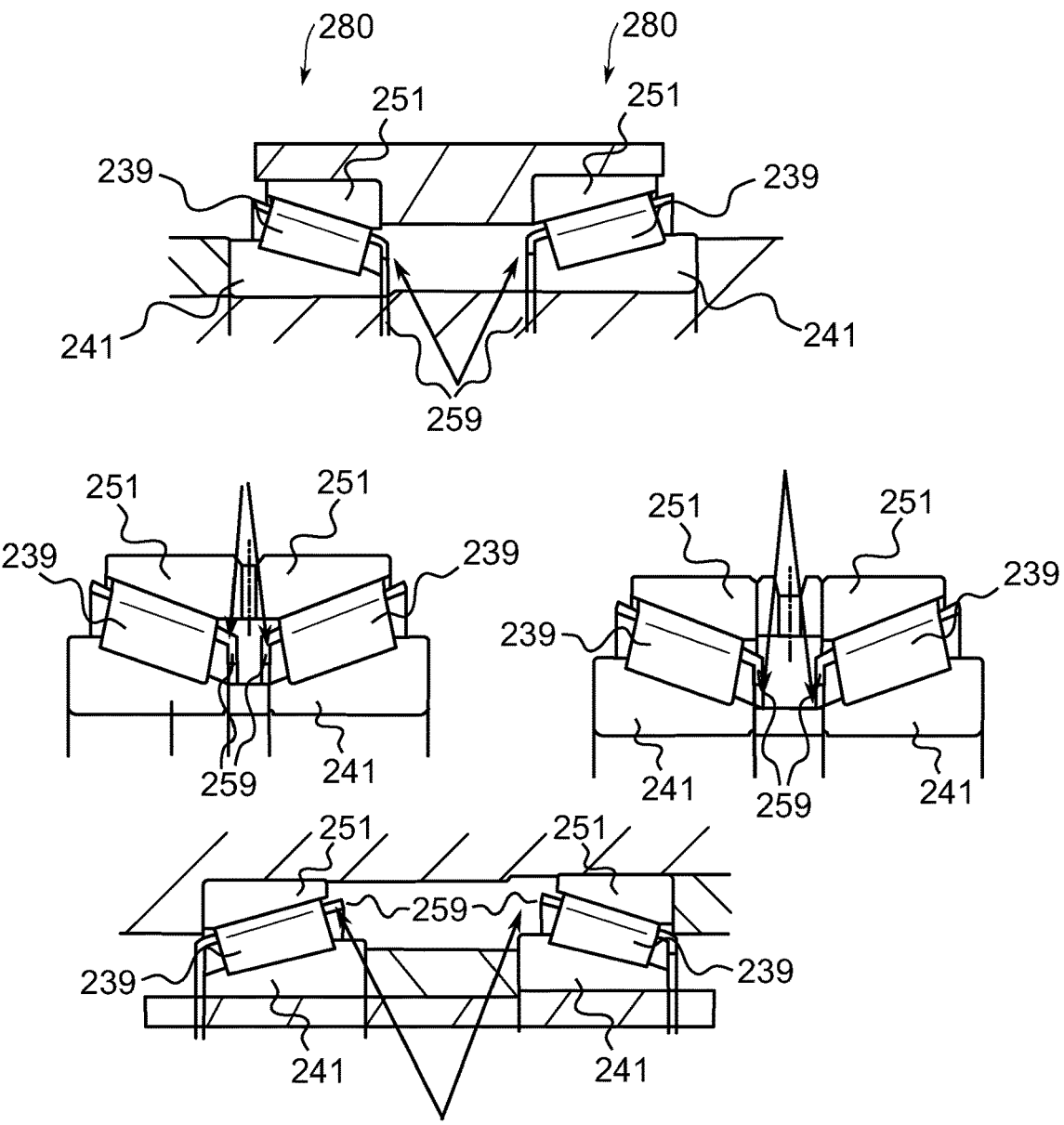
FIGS. 8A, 8B illustrate different double rolling-element bearings, which can be installed by embodiments of the present invention.
Figure 8B:
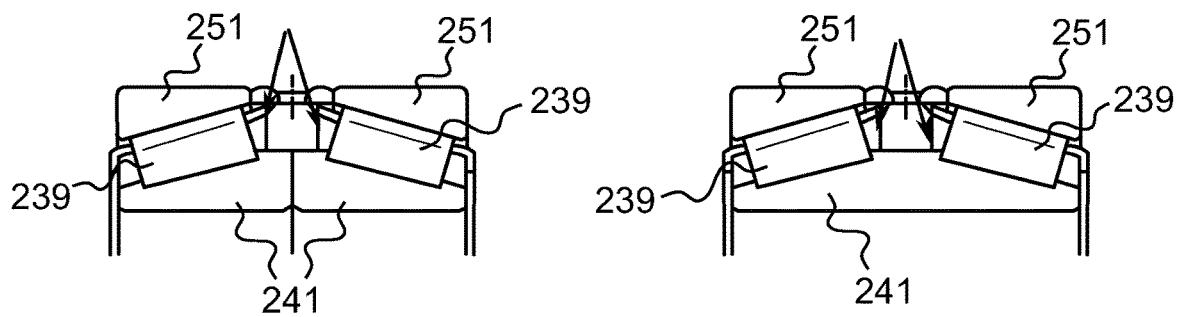

FIGS. 8A, 8B illustrate various bearing assemblies on which the bearing cage segment 100 and the assembly method are usable. FIG. 8A illustrates double tapered roller bearings in a so-called back-to-back arrangement, which each include inner rings 241 and outer rings 251, between which rollers 239 are disposed. During an installation a band clamp 259 is respectively placed on an inaccessible inner side. The bearings 280 can have different axial spacings from one another.

FIG. 8B illustrates double rolling-element bearings in a so-called face-to-face arrangement, wherein in turn during an installation the band clamp 259 is installed at an inaccessible inner side.

The cable 266 can, for example, be manufactured from or comprise steel or Kevlar. The bearing cage segment can be manufactured from plastic (e.g., PEEK), fiber composite materials, metal, or metal-plastic combinations.

Figure 9:
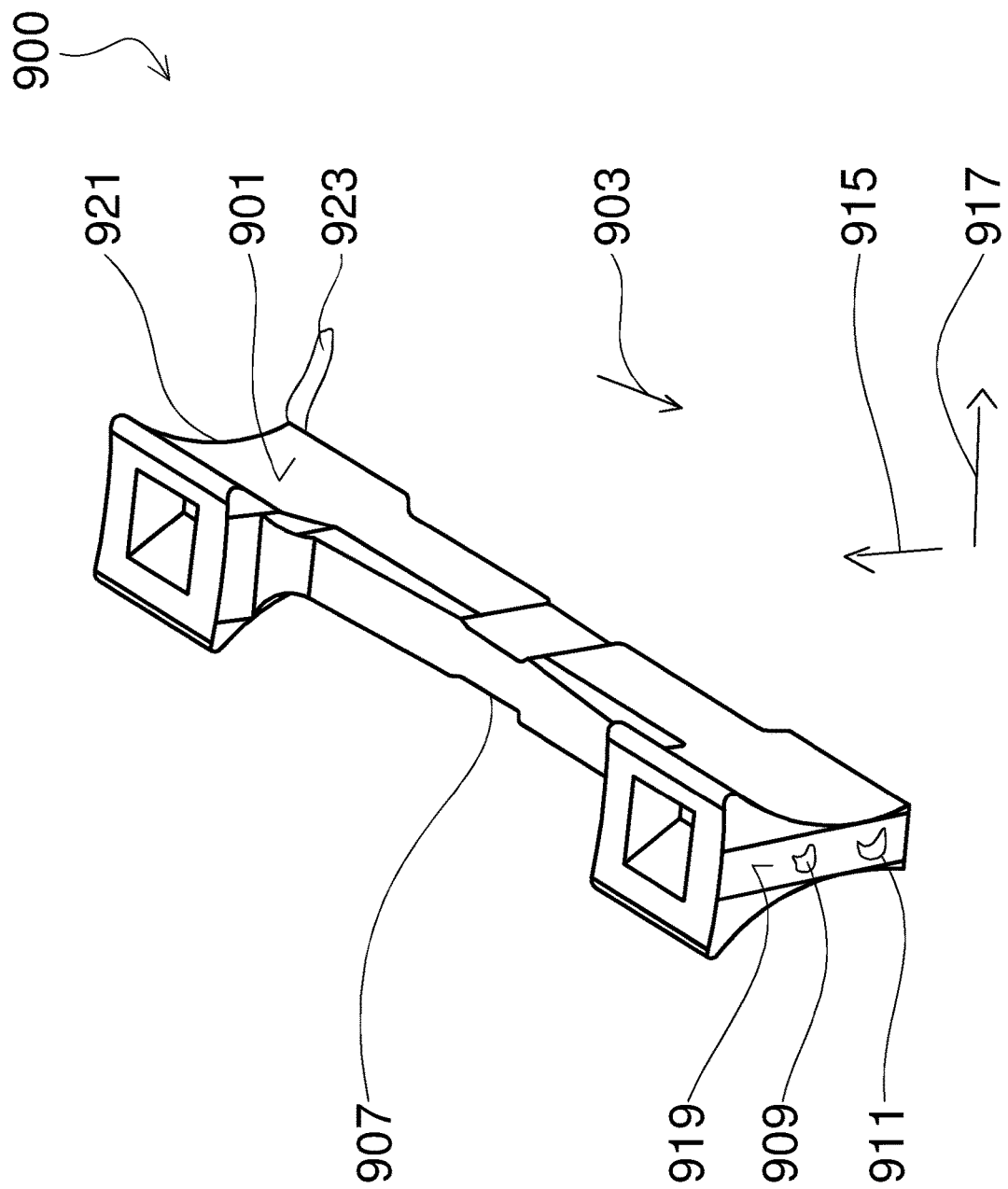
FIG. 9 schematically illustrates in a perspective view a spacer element, which can be equipped according to an embodiment of the invention with support elements as shown in FIG. 1A, 1B.

FIG. 9 schematically illustrates in a perspective view a spacer element 900, which according to one embodiment of the invention represents a bearing cage segment and can be equipped with support elements 909, 911 on one side or support elements 923 on another side, which can be configured similar to how is shown in FIGS. 1A, 1B. In operation the spacer element is disposed between two rolling elements.

REFERENCE NUMBER LIST

100 Bearing cage segment
101 First sliding surface
103 Axial direction
105 Direction in the sliding surface
107 Fourth sliding surface
109 First support element
111, 113 Second support element
115 Radial direction
117 Circumferential direction
119 Axial outer side
121 Other axial outer side
123, 125 Third support elements
127, 129 Placement surfaces
131 Placement surfaces
133 Third sliding surface
135 Second sliding surface
137 Support bridge
r1 First radial position or radial spacing
r2 Second radial position or radial spacing
239, 239a, 239b Rolling elements
241 Inner ring of the rolling-element bearing
242 Radially-inwardly-facing radially-inner-lying shoulder surface
243 Outer side of the rolling-element bearing inner ring
244 Radially-outwardly-facing radially-outer-lying shoulder surface
245 Inner side of the rolling-element bearing inner ring
247 Other end side of the rolling element
249 End side of the rolling element
251 Outer ring of the rolling-element bearing
253 Band fixing device
255 Fixing block
257 Metal clamp
259 Band clamp
261 First section of the band clamp
263 Second section of the band clamp
265 First end of the band clamp
266 Tension cable
267 Second end of the band clamp
280 Rolling-element bearing
783 Hub connection
785 Rotor side
787 Bearing axis

The invention claimed is:

1. A bearing cage segment for a rolling-element bearing, comprising:

at least one sliding surface on which a surface of at least one rolling element of the rolling-element bearing is rotatable about an axial direction;

a first support element at a first radial position (r1) for supporting a first band section of a band clamp during an assembling of the rolling-element bearing; and at least one second support element, at a second radial position (r2) different from the first radial position (r1), for supporting a second band section of the band clamp, wherein the first radial position (r1) is above and on a same side of the bearing cage segment as the second radial position (r2) with respect to the rolling-element bearing.

2. The bearing cage segment according to claim 1, wherein the first support element and the second support element are disposed on a first axially outer side of the bearing cage segment, which corresponds to an end side of the rolling element rotatable on the surface, the first axially outer side being less accessible during an assembling of the bearing than a second axially outer side of the bearing cage segment.

3. The bearing cage segment according to claim 2,
wherein the first (r1) and the second radial position (r2) are chosen such that the first band section does not overlap or cross over with the second band section during a clamping/assembling of the rolling-element bearing, wherein the at least one sliding surface comprises a first sliding surface and a second sliding surface, wherein the first (r1) and the second radial position (r2) are chosen such that a band section adjacent to the first band section abuts towards a first end of the band section in a first radial region on the first sliding surface, and that a band section adjacent to the second band section abuts towards a second end of the band section in a second radial region on the second sliding surface when the band clamp is looped around the bearing cage segment, with the result that the first end and the second end of the band clamp come to rest on the other axial outer side, further comprising: a pair of third support elements for supporting a cable section of a tension cable during the clamping/assembling of the rolling-element bearing, wherein the third support elements are disposed the second axial outer side of the bearing cage segment, which second axial outer side corresponds to another end side of the rolling element rotatable on the surface, the third support elements protruding in an axial and radial direction on the axial outer side of the bearing cage segment, wherein the first support element, the second support element, and/or the third support elements for supporting the band- or cable-section protrude substantially in an axial direction are configured at least partially concave or parabolic, wherein during the clamping/assembling of the rolling-element bearing the band section is configured to exert a force on the support elements in a direction of a radially-outwardly-facing inner shoulder surface of the inner ring, the support elements not completely surrounding the band- or cable-section, further comprising:

a band fixing device, disposable on the second axial outer side, for fixing and/or clamping the ends of the band clamp, wherein the fixing device includes a metal clamp with brackets for clamping two end sections of the band clamp and/or a fixing block for placing onto the second axial outer side of the bearing cage segment, wherein the bearing cage segment is configured for holding a rolling element in an interior of the bearing cage segment, and wherein the at least one sliding surface includes:

two inner sliding surfaces, on which a first one of the at least one rolling element abuts, and two outer sliding surfaces on each of which a second and a third one of the at least one rolling element abuts.

4. The bearing cage segment according to claim 1, wherein the first (r1) and the second radial positions (r2) are chosen such that the first band section does not overlap or cross over with the second band section during a clamping/assembling of the rolling-element bearing.

5. The bearing cage segment according to claim 1, wherein, the at least one sliding surface comprises a first sliding surface and a second sliding surface, the first (r1) and the second radial positions (r2) are chosen such that a band section adjacent to the first band section abuts towards a first end of the band clamp in a first radial region on the first sliding surface, and that a band section adjacent to the second band section abuts towards a second end of the band clamp in a second radial region on the second sliding surface when the band clamp is looped around the bearing cage segment, with the result that the first end and the second end of the band clamp come to rest on the second axial outer side.

6. The bearing cage segment according to claim 1, further comprising:

a pair of third support elements for supporting a cable section of a tension cable during the clamping/assembling of the rolling-element bearing, wherein the third support elements are disposed on the second axial outer side of the bearing cage segment, which second axial outer side corresponds to another end side of the rolling element rotatable on the surface, the third support elements protruding in an axial and radial direction on the axial outer side of the bearing cage segment.

7. The bearings cage segment according to claim 1, wherein the first support element, the second support element, and/or the third support elements for supporting the band or cable section protrude substantially in an axial direction, and are configured to at least partially concave, or parabolic, and wherein during the clamping/assembling of the rolling-element bearing the band section is configured to exert a force on the support elements, in a direction of a radially-outwardly-facing inner shoulder surface of an inner ring, the support elements not completely surrounding the band or cable section.

8. The bearing cage segment according to claim 1, further comprising:

a band fixing device, disposable on the second axial outer side, for fixing and/or clamping the ends of the band clamp, wherein the fixing device includes a metal clamp with brackets for clamping two end sections of the band clamp and/or a fixing block for placing onto the second axial outer side of the bearing cage segment.

9. The bearing cage segment according to claim 1, wherein the bearing cage segment is configured for holding a rolling element in an interior of the bearing cage segment, wherein the at least one sliding surface comprises:

two inner sliding surfaces, on which a first one of the at least one rolling element abuts; and two outer sliding surfaces, on each of which a second one and a third one of the at least one of the at least one rolling element abuts.

10. The bearing cage segment according to claim 1, wherein the first support element comprises a first axially projecting body having a radially open radially facing channel, the first support element being located on a first axially outer side of the bearing cage segment.

11. The bearing cage segment according to claim 10, wherein the at least one second support element comprises a second axially projecting body having a radially open radially facing channel and a third axially projecting body having a radially open radially facing channel, the second and third axially projecting bodies being located on the first axially outer side of the bearing cage segment.

12. The bearing cage segment according to claim 11, wherein the first support element is located radially outwardly of the at least one second support element relative to an axis of rotation of the rolling-element bearing.

13. The bearing cage segment according to claim 12, including the band clamp, the first band section of the band clamp being located in the channel of the first axially projecting body and the second band section of the band clamp being located in the channel of the second axially projecting body and in the channel of the third axially projecting body.

14. The bearing cage segment according to claim 13, wherein the at least one sliding surface comprises a first sliding surface and a second sliding surface circumferentially opposed to the first sliding surface, wherein a portion of the band clamp adjacent to the first band section extends axially across the first sliding surface, and wherein a portion of the band clamp adjacent to the second band section extends axially across the second sliding surface.

15. The bearing cage segment according to claim 14, including a clamp securing a first end of the band clamp and a second end of the band clamp to a second axially outer side of the bearing cage segment axially opposite the first axially outer side of the bearing cage segment.

16. A rolling-element bearing, comprising:

at least one bearing cage segment comprising, at least one sliding surface on which a surface of at least one rolling element of the rolling-element bearing is rotatable about an axial direction, a first support element at a first radial position (r1) for supporting a first band section of a band clamp during an assembling of the rolling-element bearing, and at least one second support element, at a second radial position (r2) different from the first radial position (r1), for supporting a second band section of the band clamp, wherein the first radial position (r1) is above and on a same side of the bearing cage segment as the second radial position (r2) with respect to the rolling-element bearing;

a plurality of rolling elements, at least one rotatably abutting on the sliding surface;

an inner ring on which the plurality of rolling elements, spaced in the circumferential direction by the bearing cage segments, abut; and an outer ring on the inner ring with the plurality of the rolling elements and the at least one bearing cage segment.

17. A method for assembling a rolling-element bearing, comprising:

disposing rolling elements on an inner ring;

disposing a bearing cage segment having at least one first and one second sliding surface such that at least the first sliding surface abuts on a surface of one of the rolling elements;

placing a first band section of a band clamp on a first support element of the bearing cage segment at a first radial position (r1) on a first axial outer side of the bearing cage segment, which during the assembling of the rolling-element bearing is less accessible than a second axial outer side of the bearing cage segment;

placing a second band section of the band clamp on a second support element of the bearing cage segment at a second radial position (r2) different than the first radial position (r1) on the first axial outer side of the bearing cage segment, the first radial position (r1) is above and on a same side of the bearing cage segment as the second radial position (r2) with respect to the rolling-element bearing;

guiding a third band section adjacent to the first band section around the bearing cage segment such that the third band section comes to rest between the one of the rolling elements and the first sliding surface and a first band end comes to rest on the second axial outer side of the bearing cage segment;

guiding a fourth band section adjacent to the second band section around the bearing cage segment such that the fourth band section comes to rest between another one of the rolling elements and the second sliding surface and a second band end comes to rest on the second outer side of the bearing cage segment;

tensioning the band clamp by pulling on the first band end and the second band end; and tensioning a cable, which is supported by a third support element of the bearing cage segment at the second axial outer side of the bearing cage segment, wherein the band clamp is configured to be removed from the second axial outer side of the bearing cage segment, which is more accessible, after completion of the assembling.

18. A bearing cage segment for a rolling-element bearing, the rolling element bearing having an axis of rotation, the bearing cage segment, including comprising:

at least one sliding surface on which a surface of at least one rolling element of the rolling-element bearing is rotatable;

a first support element located at a first radial position (r1) relative to the axis of rotation, the first support element comprising a first axially projecting body having a radially open radially facing channel, the first support element being located on a first axially outer side of the bearing cage segment, at least one second support element located at a second radial position (r2) radially inward of the first radial position, the at least one second support element comprising a second axially projecting body having a radially open radially facing channel and a third axially projecting body having a radially open radially facing channel, the second and third axially projecting bodies being located on the first axially outer side of the bearing cage segment, wherein the first radial position (r1) is above and on a same side of the bearing cage segment as the second radial position (r2) with respect to the rolling-element bearing, and a band clamp, a first band section of the band clamp being located in the channel of the first axially projecting body and a second band section of the band clamp being located in the channel of the second axially projecting body and in the channel of the third axially projecting body.

19. The bearing cage segment according to claim 18, wherein the at least one sliding surface comprises a first sliding surface and a second sliding surface circumferentially opposed to the first sliding surface, wherein a portion of the band clamp adjacent to the first band section extends axially across the first sliding surface, and wherein a portion of the band clamp adjacent to the second band section extends axially across the second sliding surface.

20. The bearing cage segment according to claim 19, comprising a clamp securing a first end of the band clamp and a second end of the band clamp to a second axially outer side of the bearing cage segment axially opposite the first axially outer side of the bearing cage segment.

* * * * *